United States Patent [19]

Weiler

[11] Patent Number: 4,596,110
[45] Date of Patent: Jun. 24, 1986

[54] CONTAINER WITH INSERT HAVING A FULLY OR PARTIALLY ENCAPSULATING SEAL WITH A FRANGIBLE WEB FORMED AGAINST SAID INSERT

[75] Inventor: Gerhard H. Weiler, South Barrington, Ill.

[73] Assignee: Automatic Liquid Packaging, Inc., Arlington Heights, Ill.

[21] Appl. No.: 402,982

[22] Filed: Aug. 3, 1982

Related U.S. Application Data

[63] Continuation-in-part of Ser. No. 296,368, Aug. 26, 1981.

[51] Int. Cl.[4] .................. B65B 43/00; B65B 61/00
[52] U.S. Cl. ......................... 53/410; 53/452; 264/524; 425/524
[58] Field of Search ............. 53/453, 559, 140, 410, 53/412, 129, 133, 128; 425/524; 264/524, 525

[56] References Cited

U.S. PATENT DOCUMENTS

| | | | |
|---|---|---|---|
| Re. 27,155 | 10/1964 | Hansen | 425/524 |
| 3,251,915 | 5/1966 | Pechthold | 264/524 |
| 3,409,710 | 11/1968 | Klygis | 264/524 X |
| 3,583,125 | 6/1971 | Vermeulen | 53/412 |
| 3,597,793 | 8/1971 | Weiler et al. | |
| 3,690,803 | 9/1972 | Pechtold et al. | 53/453 X |
| 3,765,144 | 10/1973 | Schiesser | 53/412 |
| 3,851,029 | 11/1974 | Cornett, III et al. | 264/525 |
| 3,919,374 | 11/1975 | Komendowski | 264/525 X |
| 4,176,153 | 11/1979 | Weiler et al. | 425/524 X |
| 4,425,090 | 1/1984 | Hansen | 264/525 X |

Primary Examiner—Horace M. Culver
Attorney, Agent, or Firm—Dressler, Goldsmith, Shore, Sutker & Milnamow, Ltd.

[57] ABSTRACT

A blow-molded container is provided with an insert occluding its top opening. A closure structure at least partially encapsulates the insert article and includes a frangible web formed against the insert article. The container can be blow-molded in main mold halves and the closure structure, including the frangible web, can be formed by additional mold halves while the insert article is held in the container opening by an arm that is subsequently retracted or while the insert article is supported on a parison portion that defines the container body. In the latter instance a complete overcap for the insert article can be provided.

2 Claims, 14 Drawing Figures

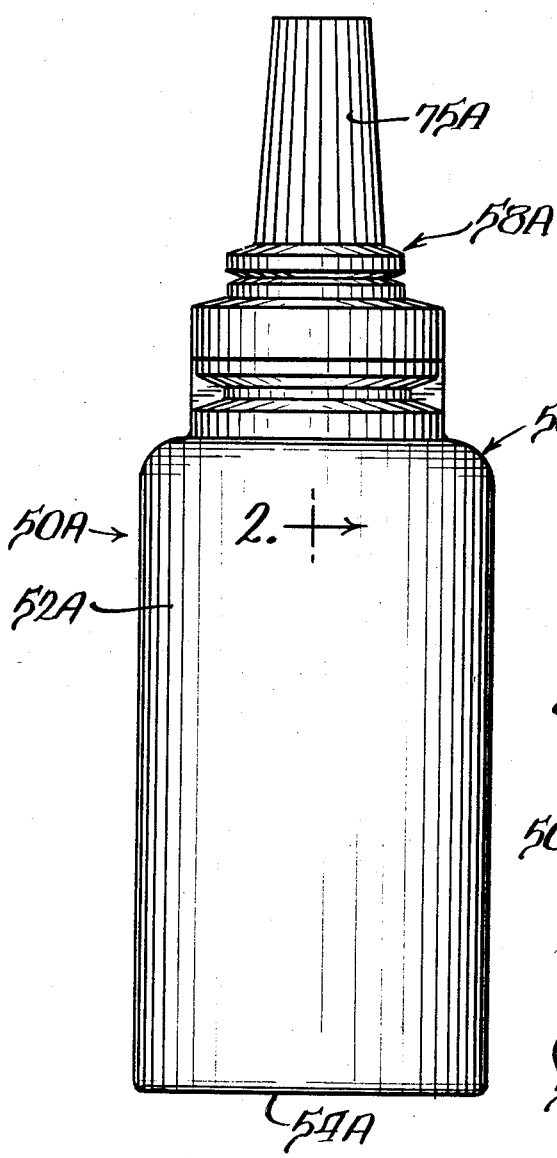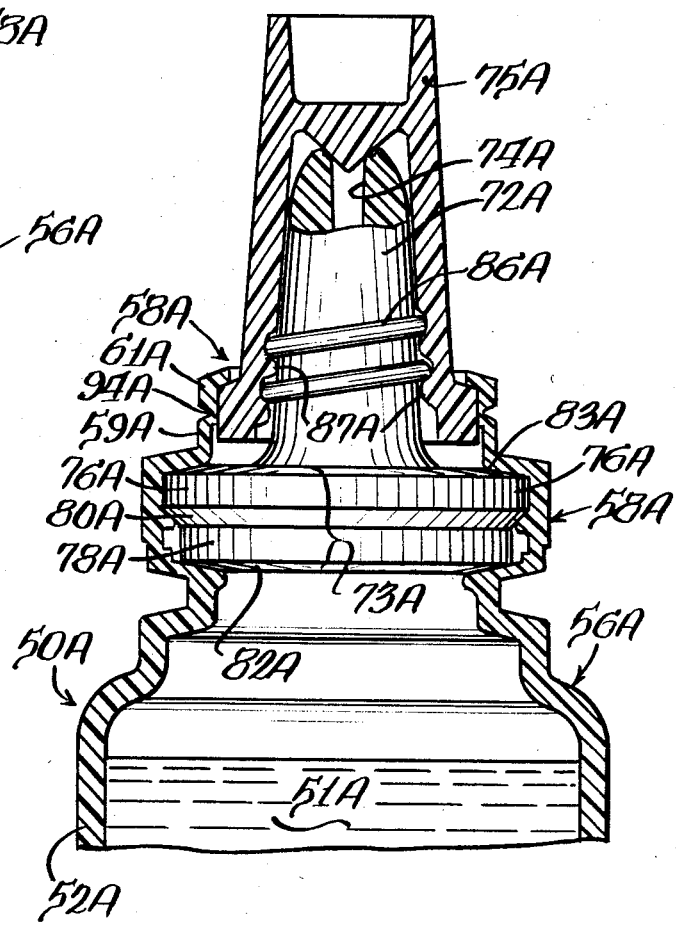

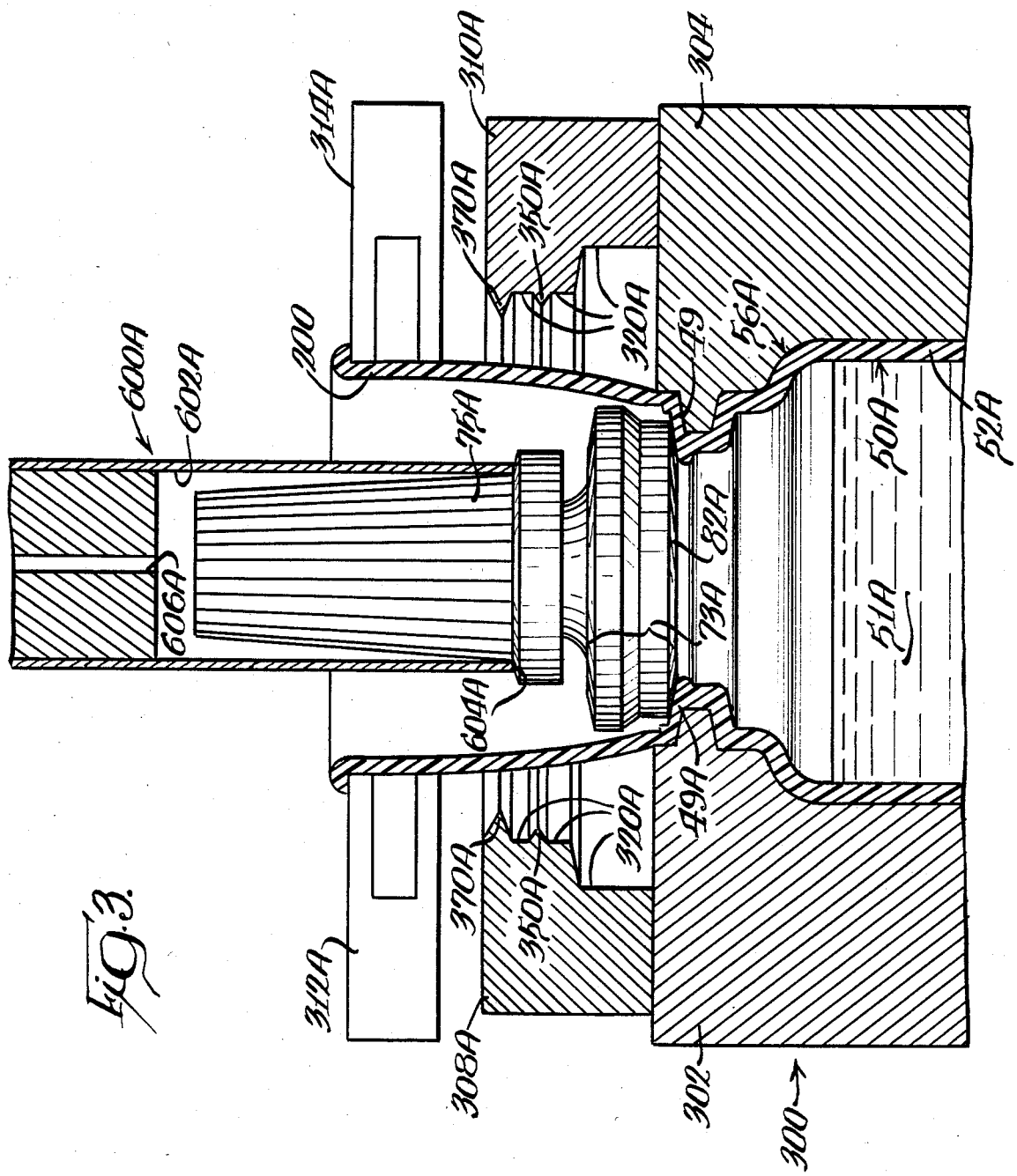

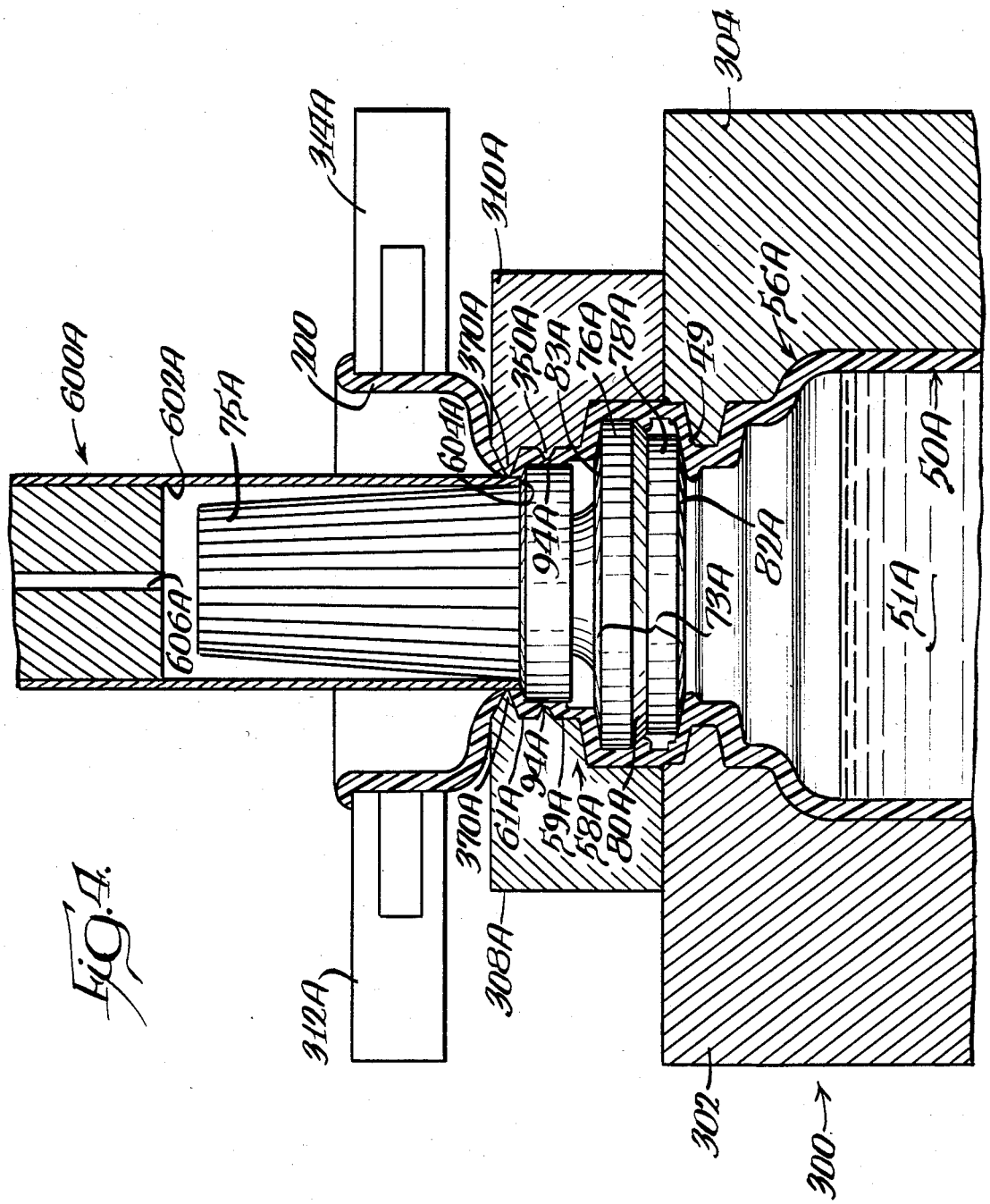

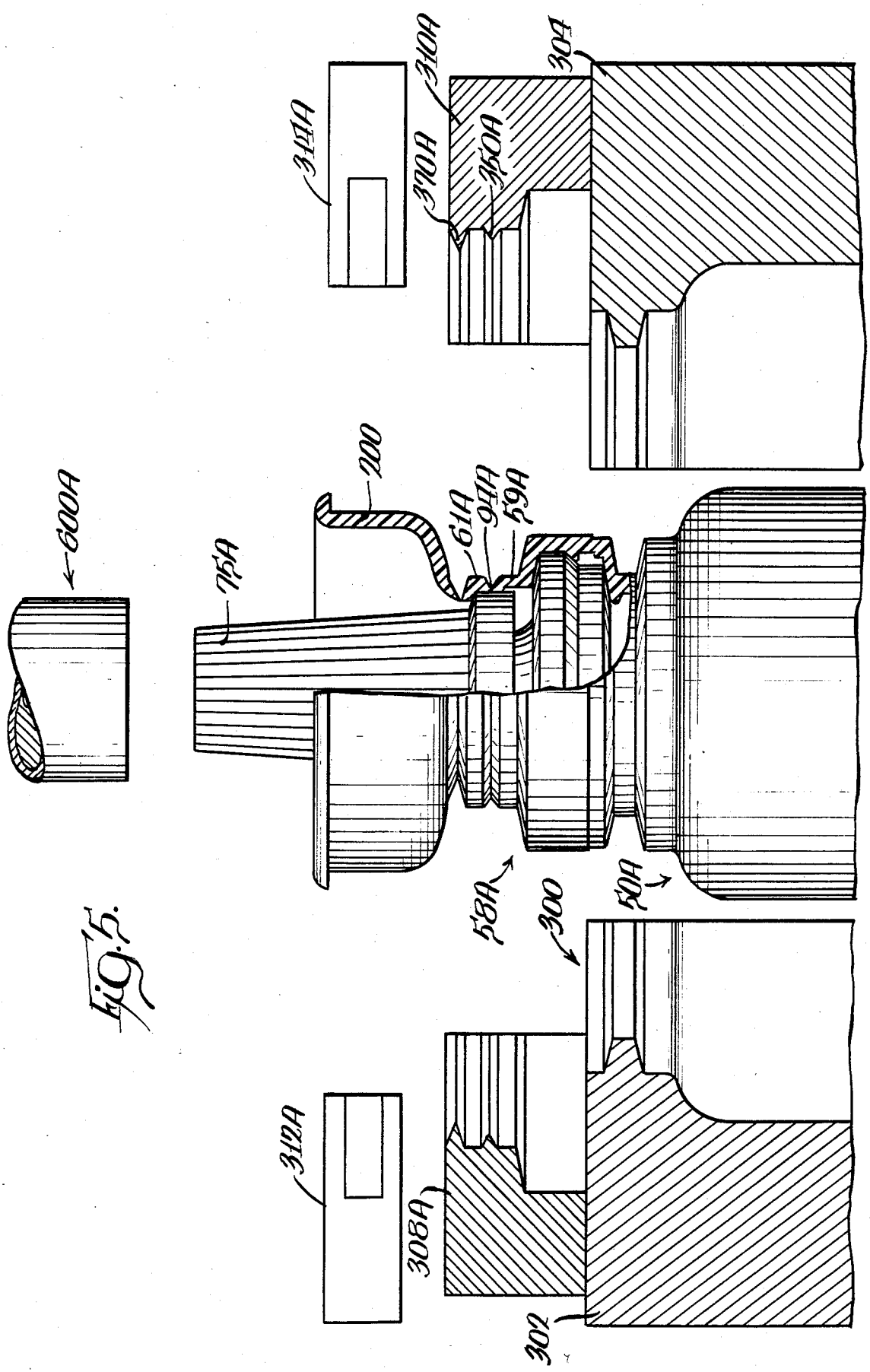

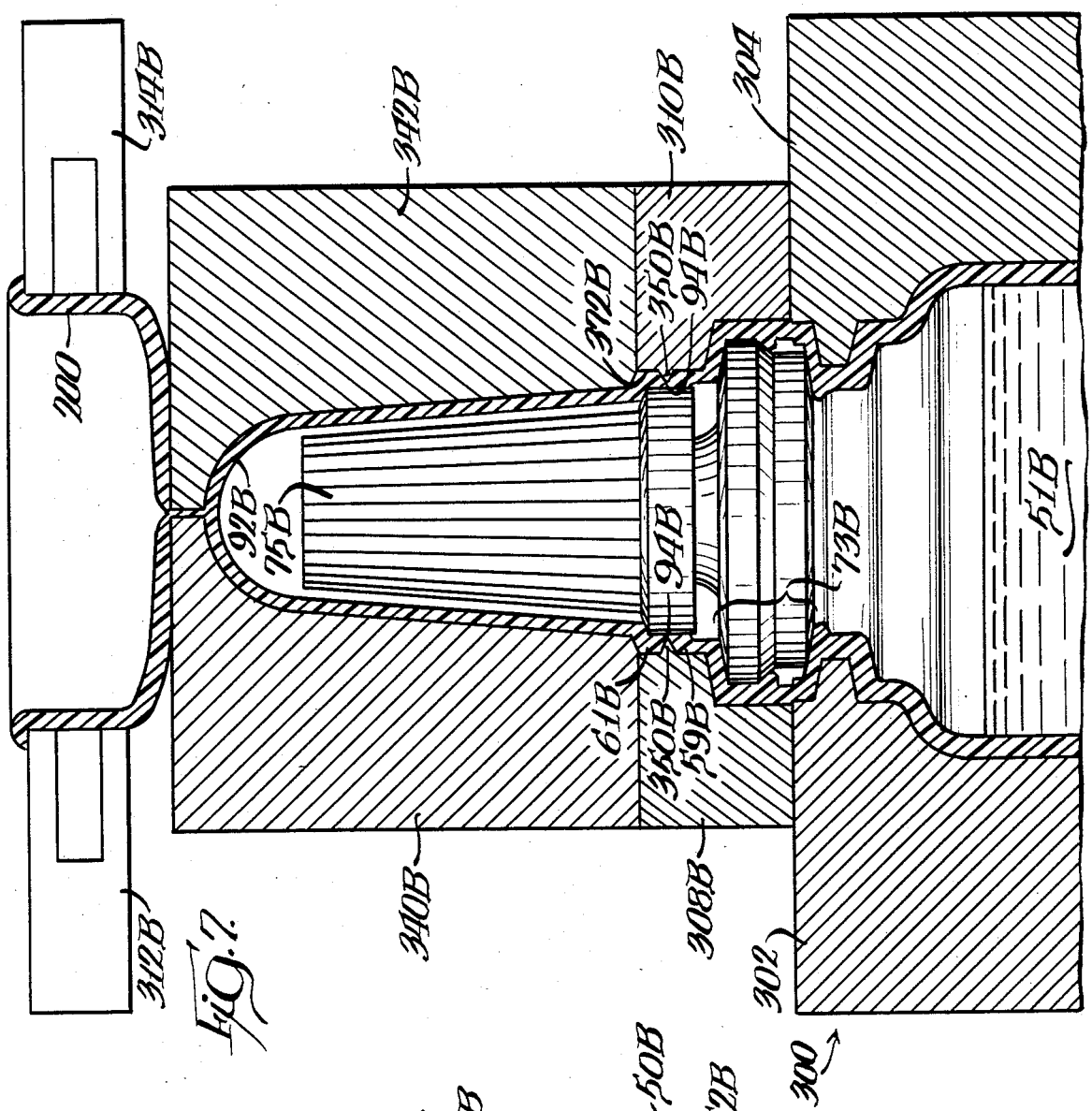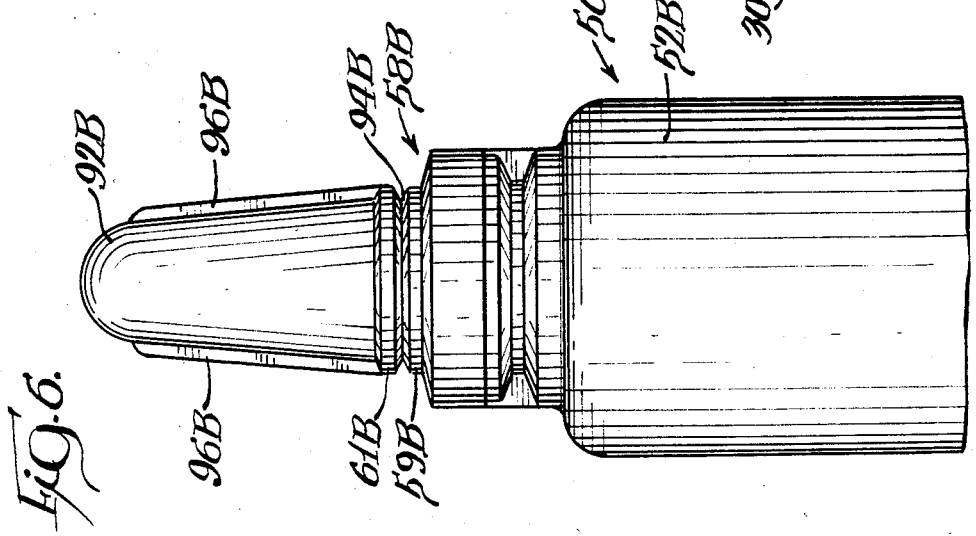

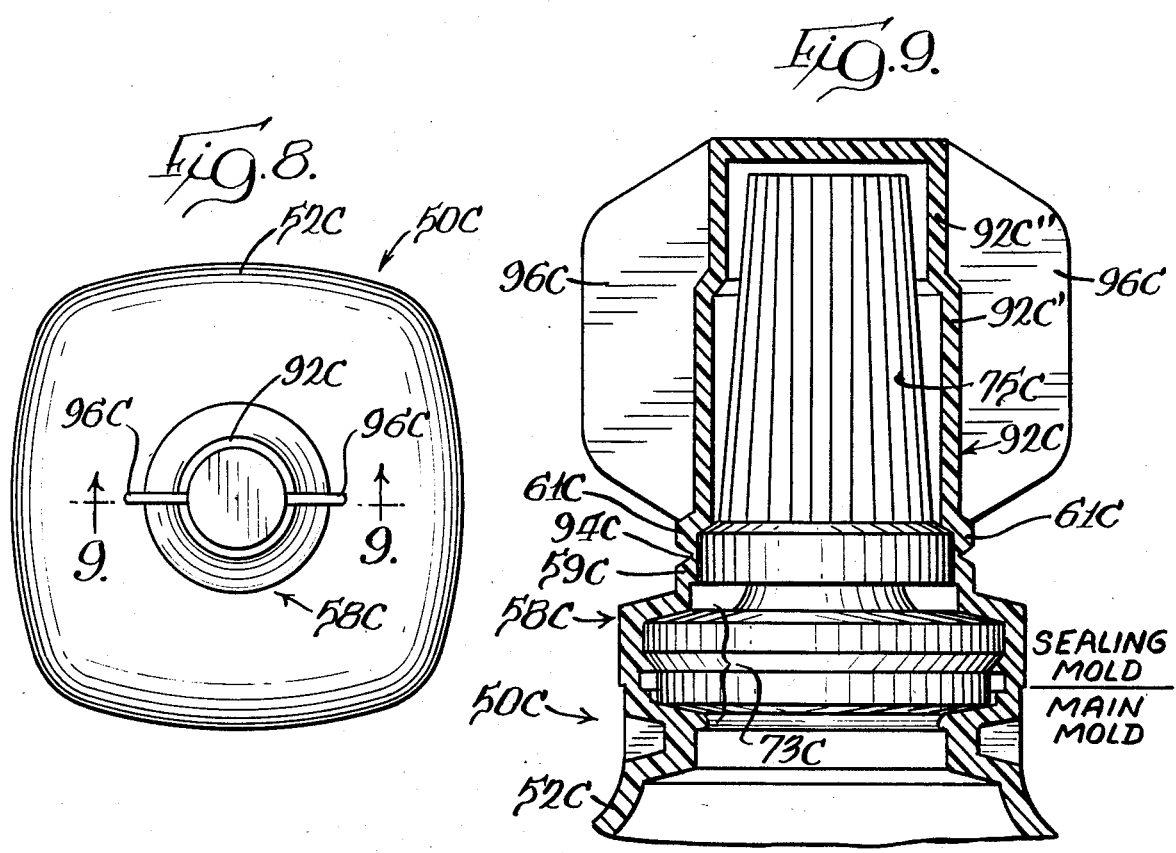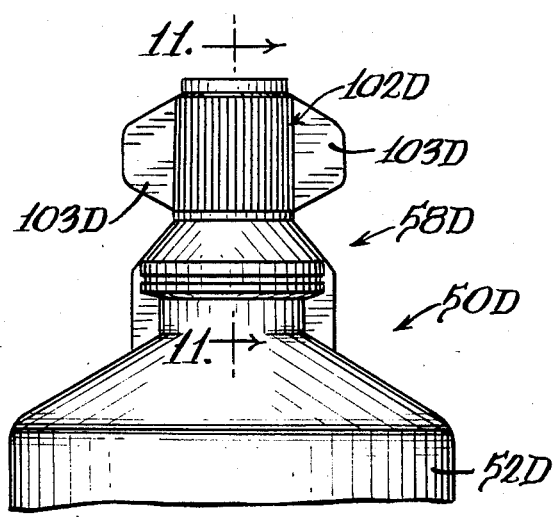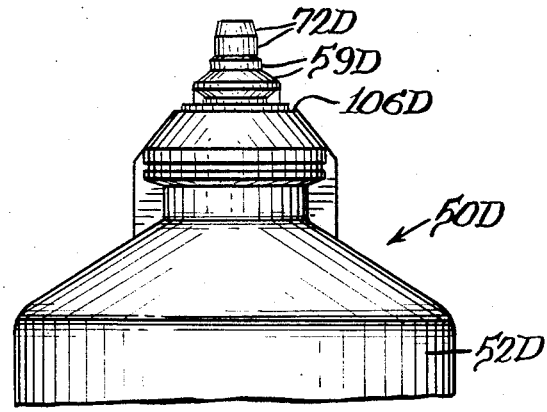

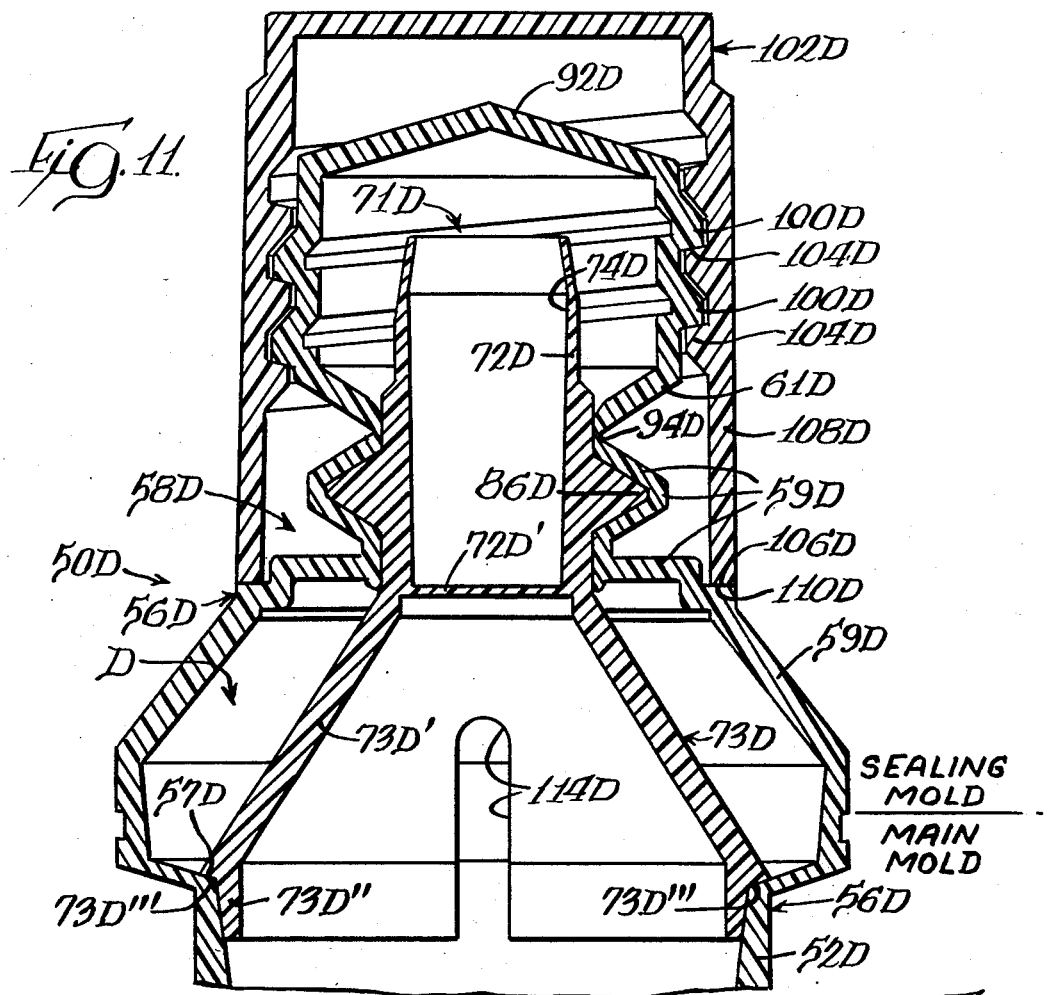
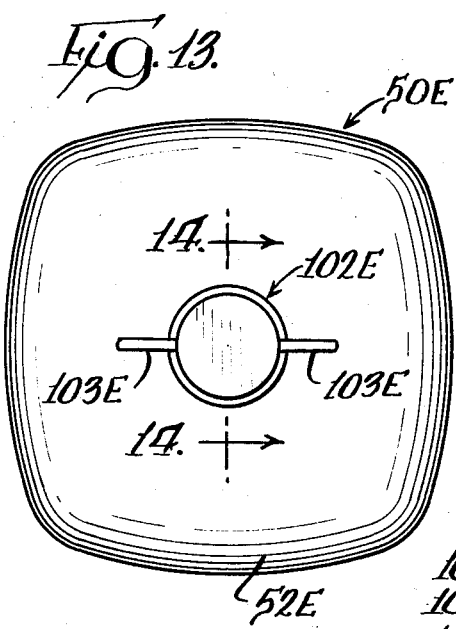
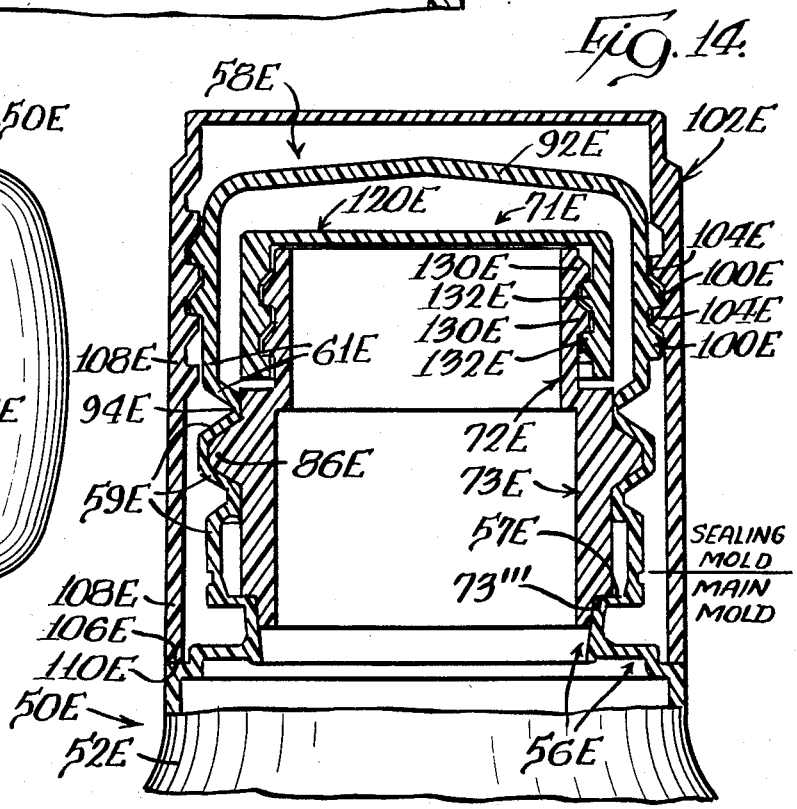

CONTAINER WITH INSERT HAVING A FULLY OR PARTIALLY ENCAPSULATING SEAL WITH A FRANGIBLE WEB FORMED AGAINST SAID INSERT

CROSS-REFERENCE TO RELATED APPLICATION

This application is a continuation-in-part of the U.S. patent application Ser. No. 296,368 filed on Aug. 26, 1981 and entitled "Container With an Encapsulated Top Insert and Method and Apparatus for Making Same".

TECHNICAL FIELD

This invention relates, in general, to molded containers with unitary closure seals and to methods and apparatus for producing such containers.

BACKGROUND OF THE INVENTION

The above-identified U.S. patent application Ser. No. 296,368 discusses various patents disclosing methods and apparatus for forming, molding, filling and sealing a container. Further, that U.S. patent application discloses a container, as well as apparatus and methods for forming the container, wherein a stopper or other insert is sealed in the top of the container.

Specifically, a length of hollow tube parison is first extruded between the main mold halves of a mold assembly. Then, while positioned between the main mold halves, a parison portion is cut from the extruder and the mold halves are moved to a station for blowing, molding and filling a container. Here the cut length of parison is positioned below a blowing and filling nozzle where the parison is molded into a container and then filled.

The stopper is initially carried by an insertion apparatus that has an insertion member in the form of a cylindrical arm. When the blowing and filling nozzle has been completely removed from the top opening of the filled container, the insertion member that is carrying the stopper is moved to position the insertion member and stopper over the container. The insertion member is then moved downwardly to deposit the stopper within the opening of the upwardly extending portion of the parison tube.

Then, sealing molds are closed to form the upper portion of the parison around the stopper to partially encapsulate the stopper. In one form of the disclosed method, a frangible web is formed by the sealing molds in a circumferential portion of the parison around and above the stopper while using the insertion member as an anvil.

A break-off tab or overcap may be subsequently formed above the stopper and frangible web, after the insertion member has been removed from the parison tube, by an additional set of upper sealing molds after the insertion member is retracted. When the container contents are to be dispensed, the tab or overcap may be broken away at the frangible web to expose an upper surface of the stopper and to permit the stopper to be removed.

Although the above-discussed container and insert structure, as well as the method and apparatus for fabricating such a structure, are satisfactory in many applications, the inventor of the present invention has found that it would be desirable to provide a container with a stopper or other insert at the top of the container wherein the frangible web is located around the insert instead of above it.

Further, it would be desirable in some applications to provide such a container and insert structure without the container material extending above the insert. This would permit the container and insert structure to be fabricated with less material.

Additionally, it would be advantageous to provide in some applications a method and apparatus for sealing a container with a multi-piece insert wherein the top of the container is hermetically sealed to each piece of the multi-piece insert and wherein a portion of at least one of the insert pieces projects beyond the container and is exposed so that it may be manipulated to open the container. With such a container and multi-piece insert structure, it would be desirable to provide a frangible web in the container material around at least one of the insert pieces to facilitate opening or fracture of the seal when desired.

SUMMARY OF THE INVENTION

A container is formed from thermoplastic material and comprises a body defining an opening at one end, an insert article positioned at the body opening, and a closure structure unitary with the body portion. The closure structure encapsulates at least a portion of the insert article to seal closed the container. The closure structure includes a wall member unitary with the container and having first and second portions joined together with a frangible web that is formed by compression of the wall member, while in a plastic state, against the insert article to form a reduced thickness region defining the frangible web.

A novel method may be used for forming the container with the closure structure encapsulating at least a portion of the insert article. An extruded length of parison in the form of a vertically oriented, elongated, hollow tube is positioned in a closed main mold while maintaining an opening at the top of the remaining length of parison above the closed main mold as the container is formed from the parison in the main mold.

An insert article is positioned within the hollow tube of parison at the top of the molded container. Finally, at least some of the remaining length of parison around at least a portion of the insert article is compressed to seal the container to the insert article. The compressing step includes urging the parison against the insert article to form a reduced thickness region defining in a produced wall member a peripheral frangible web joining first and second portions of the remaining parison length. When a container formed in the foregoing manner is to be used, a severing force, e.g., torque, may be applied to one of the first and second portions of the produced wall member to sever the frangible web and open an access to the container contents.

Apparatus for effecting the above-described method for forming the novel container and insert structure includes means for initially forming the container body with an open top, gripping means for maintaining an opening at the top of the length of parison above the container body, and sealing mold means for sealing the top of the formed container. This apparatus is further characterized in that a positioning means is provided for positioning the insert article at the container top opening and that the sealing mold means has a unique configuration.

Specifically, the sealing mold means includes molding means closable about the insert article and the surrounding parison for controllably compressing the parison between the insert article and the molding means to thereby seal the formed container against at least a portion of the insert article. The sealing mold means also includes a frangible web forming means associated with the molding means for further molding a portion of the compressed parison to form a reduced thickness region defining the frangible web.

Numerous other features of novel containers, methods for fabricating the containers, and an apparatus for fabricating the containers will be apparent from the following detailed description and accompanying drawings.

BRIEF DESCRIPTION OF THE DRAWINGS

In the accompanying drawings forming part of the specification, and in which like numerals are employed to designate like parts throughout the same, FIG. 1 is a side view of a first embodiment of a container of the present invention with a partially encapsulated composite insert article, specifically a threaded closure;

FIG. 2 is an enlarged, fragmentary, partial cross-sectional view taken along the plane 2—2 in FIG. 1;

FIGS. 3-5 are schematic diagrams, partly in section, generally illustrating the manner in which the container of FIGS. 1 and 2 is fabricated;

FIG. 6 is a fragmentary, side view of a modified form or second embodiment of a container with a fully encapsulated composite insert article;

FIG. 7 is a schematic diagram, partly in section with the container of FIG. 6 rotated 90°, generally illustrating the manner in which the container of FIG. 6 is fabricated;

FIG. 8 is a top plan view of a third embodiment of a container of the present invention with a fully encapsulated composite insert article;

FIG. 9 is a greatly enlarged, fragmentary, partial, cross-sectional view taken along the plane 9—9 in FIG. 8;

FIG. 10 is a fragmentary, front view of a fourth embodiment of a container of the present invention having an insert article sealed within a frangible encapsulating wall and having an external threaded cap;

FIG. 11, on the sheet of drawings with FIGS. 13 and 14, is a greatly enlarged, fragmentary, cross-sectional view taken along the plane 11—11 in FIG. 10;

FIG. 12, on the sheet of drawings with FIGS. 8, 9, and 12, is a view similar to FIG. 10 but showing the threaded cap removed and the encapsulating wall severed from around a portion of the insert article;

FIG. 13 is a top plan view of a fifth embodiment of a container of the present invention having (1) an insert article with a first threaded cap that are together sealed within a frangible encapsulating wall and (2) a second, external threaded cap; and FIG. 14 is a greatly enlarged, fragmentary, partial cross-sectional view taken along the plane 14—14 in FIG. 13.

DESCRIPTION OF THE PREFERRED EMBODIMENTS

This invention may be used in many different forms. The specification and the accompanying drawings disclose only a few specific forms as an example of the use of the invention. The invention is not intended to be limited to the embodiments illustrated, and the scope of the invention will be pointed out in the appended claims.

The precise shapes and sizes of the components herein described are not essential to the invention unless otherwise indicated.

For ease of description, the apparatus of this invention will be described in the normal (upright) operating position. Terms such as upper, lower, horizontal, etc., will be used reference to this position. It will be understood, however, that the apparatus of this invention may be manufactured, stored, transported, used, and sold in an orientation other than the position described.

The apparatus of this invention has certain conventional drive mechanisms and control mechanisms the details of which, although not fully illustrated or described, will be apparent to those having skill in the art and an understanding of the necessary functions of such mechanisms.

The present invention incorporates many of the method steps and much of the apparatus disclosed in the copending U.S. patent application Ser. No. 296,368 discussed above under the section entitled "Cross-Reference to Related Application." The disclosures of that application are incorporated herein by reference thereto to the extent that such disclosures are pertinent and not inconsistent with the present specification.

For ease of understanding the present invention, a thermoplastic container will first be described. This will be followed by a description of the method for molding the container, filling the container from the top, positioning an insert article at the top of the container, and then sealing the top of the container against the insert article to form a frangible web within a container closure structure.

Next, second through fifth embodiments of a thermoplastic container will be described along with the methods for fabricating such containers.

THE CONTAINER: FIRST EMBODIMENT

A first embodiment of a formed, filled, and sealed container 50A is illustrated in FIGS. 1 and 2. The container 50A is preferably fabricated from conventional thermoplastic molding materials such as polyethylene (low or high density), polypropylene, and the like materials compatible with the container content.

The teachings of the present invention find application in the production of filled and unfilled containers having a wide variety of shapes and sizes. Typically, such containers have a volume ranging from between about 5 milliliters to between about 1 or 2 liters.

The container 50A is an example of one such container and includes a generally cylindrical, hollow body or body portion 52A having a bottom 54A and a top or top portion 56A. The top 56A of the container body portion 52A terminates in a closure structure 58A.

The container closure structure 58A may be one of a variety of designs. For example, the closure structure 58A may be designed to hold or retain a stopper or may include a pierceable membrane. The stopper or the membrane may be pierced with a cannula, spike, hypodermic syringe, or the like, by which the container contents 51A may be withdrawn. Alternatively, the closure structure 58A may permit complete removal of an encapsulated stopper. In another embodiment, the closure structure 58A may hold or retain a dispensing nozzle instead of a stopper per se.

In the first embodiment of the container 50A illustrated in FIGS. 1 and 2, the top closure structure 58A holds or retains a composite insert article or auxillary component comprising a nozzle assembly that includes (1) a dispensing tip or nozzle 72A, (2) a connected base 73A, and a cap 75A.

The nozzle base 73A comprises (1) an upper cylindrical portion 76A, (2) a lower, reduced diameter cylindrical portion 78A, and (3) a frustoconical portion 80A joining the upper portion 76A to the lower portion 78A.

The upper portion 76A of the base 73A has a beveled edge 83A joining an upwardly facing annular flat surface (not visible in FIGS. 1 and 2) which surrounds and merges with the nozzle 72A. The base lower portion 78A also includes a beveled edge or bearing surface 82A.

The nozzle 72A includes the usual dispensing bore or aperture 74A extending from the upper distal end of the nozzle, through the nozzle, and to the bottom of the nozzle base 73A. The nozzle 72A also includes a conventional exterior thread 86A onto which the cap 75A may be screwed. To this end, the cap 75A includes a suitable mating internal thread structure 87A.

As best illustrated in FIG. 2, the thermoplastic material of the closure structure 58A forms an upstanding wall member that surrounds the nozzle assembly base 73A and extends upwardly to partially encapsulate the lower portion of the cap 75A. In particular, the closure structure 58A sealingly encapsulates the nozzle base 73A and is sealingly engaged with a portion of the lower beveled edge bearing surface 82A, the frustoconical portion 80A, the upper cylindrical portion 76A, the upper beveled edge 83A, and the enlarged cylindrical lower portion of the cap 75A.

The term "closure structure", as used in the specification and in the claims, refers to the thermoplastic material (such as 58A in FIG. 2) that extends upwardly of the container body top portion (such as top portion 56A in FIG. 2) and that is sealingly engaged with the insert article (such as the base 73A of the nozzle 72A and the cap 75A in FIG. 2). In the first embodiment illustrated in FIGS. 1 and 2, this closure structure 58A is thus seen to be unitary with both the container body portion 52A and the container top portion 56A. The closure structure 58A encapsulates at least a portion of the composite insert article to seal closed the container and, as described hereinafter for some alternate embodiments, the closure structure 58A may completely encapsulate the composite insert article.

The closure structure 58A can be more specifically defined as including a peripheral wall having a first or lower portion 59A and a second or upper portion 61A which are joined together with a frangible web or reduced thickness region 94A of the molded thermoplastic material. The frangible web 94A is formed, as will be explained in detail hereinafter, by compression of the closure structure thermoplastic material while plastic against the composite insert article (the exterior surface of the cap 75A) to form an annular notch or reduced thickness region defining the frangible web 94A between the first wall portion 59A and the second wall portion 61A. Frangible web 94A abuts the insert article, in particular, the side wall of cap 75A.

When it is desired to gain access to the contents 51A of the container 50A, force may be applied to the wall portions 59A and 61A to sever the frangible web 94A. This can be effected, for example, by peeling or pulling away from the cap 75A the upper or second wall portion 61A of the closure structure 58A so that wall portion 61A is torn or severed from the remainder of the structure along the frangible web 94A. Alternatively, unscrewing the cap 75A from the nozzle 72A will cause the upper or second wall portion 61A of the closure structure 58A to be severed from the remainder of the closure structure 58A at the frangible web 94A. Removal of the cap 75A completely from the nozzle 72A thus permits the contents 51A of the container 50A to be dispensed through the nozzle 72A.

METHOD AND APPARATUS FOR MAKING THE FIRST EMBODIMENT OF THE CONTAINER

The preferred method for forming the first embodiment of the container 50A illustrated in FIGS. 1 and 2 will next be described with reference to FIGS. 3-5. These figures progressively illustrate the sequence of the steps of the method.

The novel method steps of the present invention may be effected to position an insert article at the top opening of the container and to form a closure structure unitary with the container for encapsulating at least a portion of the insert article. Typically, the body of the container is initially formed by conventional methods and/or by the method fully described in the above-identified U.S. patent application Ser. No. 296,368.

U.S. patent application Ser. No. 296,368 describes in detail a method for blow molding a container from thermoplastic material as illustrated in FIGS. 3-5 of that patent application and reference is directed thereto. Basically, a length of parison 200 is extruded from a conventional extruder head in the form of a vertically oriented, elongated, hollow tube of a semi-molten thermoplastic material, i.e., in a plastic state. Before, during or after the parison 200 is extruded to the desired length, a mold assembly is positioned in spaced relationship from and around the parison 200.

Next, with the upper end of the parison 200 prevented from collapsing by the holding jaws 312 and 314A, the parison 200 is severed, above the holding jaws 312A and 314A and below the extruder head (not illustrated) in a conventional manner, i.e., by means of a moving cutter, such as a hot wire, a blade, or the like (not illustrated). The mold assembly itself is designated generally by reference numeral 300. The mold assembly includes a lower, first, or main mold comprising mold half 302 and mold half 304. The assembly also includes a pair of two coacting second or upper sealing mold halves 308A and 310A as well as the previously mentioned pair of two vacuum operable holding jaws 312A and 314A.

The first or main mold halves 302 and 304 cooperate when moved together to define a first cavity for the container 50A. The inside surfaces of the mold halves 302 and 304 serve to mold the thermoplastic material to define the sidewall of the container body portion 52A, the container bottom (not visible in FIG. 3), the container top 56A, and a lower portion of the container closure structure 58A (not yet fully formed in FIG. 3 but illustrated as fully formed in FIGS. 1 and 2).

In FIG. 3 the first or main mold halves 302 and 304 are shown in a closed position around the container 50A. The mold halves 302 and 304 have been moved to the closed position from an open position in which they were spaced apart by a distance sufficient to permit the parison 200 to hang between them. The main mold halves 302 and 304 are moved together to the closed position by suitable means, such as a fluid cylinder actuator or actuators (not illustrated).

The second or upper sealing mold halves 308A and 310A are preferably positioned in sliding engagement with the tops of the first or main mold halves 302 and 304, respectively. The second or upper sealing mold halves 308A and 310A are preferably directly carried by the first or main mold halves 302 and 304, respectively, and are thus movable with the main mold halves 302 and 304 between (1) the main mold open position illustrated in FIG. 5 and (2) the main mold closed position illustrated in FIG. 3.

The upper sealing mold halves 308A and 310A are also capable of movement relative to the main mold halves 302 and 304. Specifically, when the main mold halves 302 and 304 are in the main mold closed position illustrated in FIG. 3, the second or upper sealing mold halves 308A and 310A can be moved by suitable conventional actuators (not illustrated) to a sealing position (FIG. 4) to form the container closure structure 58A (FIGS. 1 and 2) as will be described in detail hereinafter.

The vacuum operable holding jaws or parison grippers 312A and 314A are adapted to be moved between an extended gripping position and a retracted position. Means for effecting such movement may be provided separately of the means for moving the first and second main mold halves 302 and 304. However, jaws 312A and 314A are preferably mounted for movement with the first mold halves 302 and 304. Thus, when the first main mold halves 302 and 304 are in the open position (FIG. 5), the holding jaws 312A and 314A are spaced from the parison 200. When the first mold halves 302 and 304 are in the closed position illustrated in FIG. 3, the holding jaws 312A and 314A, having moved with the first or main mold halves 302 and 304, are adapted to engage a portion of the parison 200 extending upwardly above the closed first mold halves 302 and 304. The jaws 312A and 314A grip the parison 200 by means of a reduced pressure or vacuum (as effected by suitable conventional means not illustrated) between the surface of the 200 parison and the gripping surfaces of the holding jaws 312A and 314A.

When the first or main mold halves 302 and 304 are in the closed position illustrated in FIG. 3, the holding jaws 312A and 314A are in the extended gripping position and ready to engage the upper end of the parison 200 that extends above the first and second pairs of mold halves. At this point in the process, pressurized air is discharged from the extruder head (not illustrated) through a suitable conventional tube (not illustrated) to expand the parison 200 slightly so that it comes into contact with the parison grippers or holding jaws 312A and 314A as illustrated in FIG. 3. This parison expansion process is conventional and well known to those skilled in the art. The holding grippers 312A and 314A, through the vacuum or reduced pressure effected between the parison 200 and the inner surfaces of the jaws 312A and 314A, maintain an opening in the upper end of the parison.

Typically, a number of containers 50A are fabricated at one time in a multi-cavity mold assembly. For ease of description, only one mold cavity is illustrated. It is to be realized, however, that the mold assembly 300 may include a plurality of cavities aligned in a row and that a plurality of extruder heads may be provided in a row for extruding a length of parison into each cavity.

The mold assembly 300 is typically mounted on a hydraulically-actuated mold carriage (not illustrated in the simplified schematic diagrams of FIGS. 3–5) which moves the mold assembly, including the holding jaws 312A and 314A, into the proper parison receiving position below the extruder head (not illustrated). The carriage also functions to subsequently carry the mold assembly 300, with holding jaws 312A and 314A, from the parison receiving position beneath the extruder head to a position displaced from the extruder head where the severed length parison 200 is molded i.e. (blown or vacuum-formed) into a container shape, then filled, and finally sealed. One such carriage, integral with a complete molding apparatus, is described in detail with reference to the above-identified U.S. patent application Ser. No. 296,368 and reference is directed thereto.

After the parison 200 has been severed from the extruder, the mold assembly 300 is moved by the mold assembly carriage (not illustrated) along with holding jaws 312A and 314A away from the extruder head (not illustrated) in a direction normal to the plane of FIG. 3. The mold carriage typically moves the mold assembly 300 with holding jaws 312A and 314A a distance of about 30 centimeters to the molding, filling, inserting and sealing station wherein the severed length of parison is molded, filled, provided with an insert and sealed as will next be explained.

The molding, filling, inserting and sealing station is illustrated in FIG. 3 where the container 50A is shown as having been molded and filled with liquid contents 51A. Molding can be effected by blow forming, vacuum forming, or a combination of both of the foregoing expedients depending on container size. At this station, a vertically reciprocable composite blowing and filling mandrel (not illustrated) is provided along with a vertically reciprocable insert article pick up and placement arm 600A (FIG. 3).

The blowing and filling mandrel is described in detail with reference to the above-identified U.S. patent application Ser. No. 296,368 and reference is directed thereto wherein a composite blowing and filling mandrel 500 is described with reference to FIGS. 5 and 15–19 of that patent application.

In addition to being vertically reciprocable, both the composite blowing and filling mandrel and the arm 600A are laterally reciprocable. Preferably, in the preferred embodiment, the composite blowing and filling mandrel and the arm 600A are carried on a suitable common structure or carriage (not illustrated) for effecting a common lateral reciprocation of the composite mandrel and arm 600A. Such a carriage for effecting common lateral reciprocation of a composite mandrel and an insert article pick up and placement arm is described in the above-identified U.S. patent application Ser. No. 296,368. Reference is directed thereto for the description of such a carriage for a composite mandrel 500 and for an arm 600 (which is functionally analogous to the arm 600A described and illustrated herein).

In any case, with the severed parison 200 properly positioned at the molding, filling, inserting and sealing station, the composite blowing and filling mandrel is in registry (or is moved into registry) with the opening at the upper end of the severed length of the parison. Then the composite mandrel is extended downwardly into the opening of the upper end of the severed length of the parison to seal the parison opening with the mandrel and to press the parison against the first or main mold halves 302 and 304.

The composite mandrel preferably includes a conventional blowing tube and a conventional filling tube. The composite mandrel may be of a suitable conventional design such as the mandrels disclosed in the above-discussed U.S. patent application Ser. No. 296,368 or U.S. Pat. No. 3,919,374 and/or found in commercial machines that incorporate a single mandrel for molding and filling the container.

In operation, compressed gas, such as air or the like, is discharged through the mandrel blowing tube into the interior of the hollow parison to inflate the parison outwardly against the walls of the cavity defined by the first or main mold halves 302 and 304 with or without vacuum assist through small passageways in the molds. The compressed gas is typically discharged for about one second. Next, the filling tube inside the composite mandrel is reciprocated downwardly to open a vent passage in the mandrel to permit venting of the compressed gas out of the molded container. Subsequently, the blowing tube is moved downwardly a small amount within the mandrel to open the product dispensing valve and permit the product to be injected under pressure from the filling tube into the formed container.

The product, typically a liquid (indicated by reference numeral 51A and already filling the container 50A in FIG. 3), is usually at a relatively lower temperature than the parison and assists in solidifying the walls of the formed container. After the formed container 50A has been filled with the desired amount of product 51A, the composite mandrel is withdrawn from the open end of the parison. If it is desired to form an unfilled container, the filling procedure, of course, is omitted from the manufacturing process.

When the composite blowing and filling mandrel has been elevated to a position above the holding jaws 312A and 314A, the composite mandrel is moved away from the parison open end while the pick up and placement arm 600A is moved into alignment or registry with the opening at the upper end of the parison. The arm 600A then is extended downwardly into the parison as illustrated in FIG. 3.

The pick up and placement arm 600A functions to perform a secondary operation through the parison top opening on the remaining length of parison 200 above the closed main mold halves 302 and 304. Specifically, the arm 600A functions to position an insert article or auxiliary component within the remaining length of parison 200 above the closed main mold halves, which auxiliary component is ultimately fully or partially encapsulated in the container top closure structure.

In the method illustrated in FIGS. 3-5, the arm 600A is shown as positioning the composite insert article (comprising the assembly of the nozzle 72A and cap 75A) in the parison opening for subsequent partial encapsulation by the parison 200.

The particular configuration illustrated for the composite insert article (nozzle 72A and cap 75A) is not essential to the novel method taught herein. The method may be used with single or multi-piece articles having various shapes.

The insert article (such as nozzle 72A and cap 75A) is held in a suitable manner by the arm 600A. One such suitable manner includes the use of vacuum drawn in a cylindrical holding or receiving cavity 602A at the bottom end of the arm 600A against which is positioned the insert article. The insert article can also be held by arm 600A using a mechanical retention means such as friction, a snap-fit releasable interlock, or other means.

When using a vacuum-assisted pick up action, the distal end of the pick up arm 600A defines a generally downwardly facing annular sealing surface 604A which contacts an upper surface of the insert article (such as the top of the base portion of the cap 75A as illustrated). The arm 600A defines a suitable bore 606A which communicates with the receiving cavity 602A. The bore 606A is connected to a suitable source of vacuum (not illustrated). A reduction in pressure is effected through the bore 606A and the insert article (such as nozzle 72A and cap 75A) is thus maintained in the bottom of the pick up arm 600A by means of the pressure differential between the reduced pressure in the receiving cavity 602A and ambient atmospheric pressure.

The structure of the pick up arm 600A need not be limited to that described above with reference to FIG. 3. Depending upon the shape of the insert article, other structures may be used. An example of another form of a pick up arm is described in the above-identified U.S. patent application Ser. No. 296,368 with reference to arm 600 illustrated in the various figures of that patent application.

The insert article may be automatically positioned on the end of the pick up arm 600A by suitable apparatus. Although such suitable article placement apparatus is not described or illustrated herein, one design for a stopper insert article is described in the above-identified U.S. patent application Ser. No. 296,368 with reference to feeder apparatus 700 and transfer apparatus 720 illustrated in the various figures of that patent application.

In any case, the insert article pick up arm 600A, with the insert article placed thereon, is extended downwardly and aligned vertically within the upper opening of the parison 200 adjacent the second or upper sealing mold halves 308A and 310A.

Preferably, the pick up arm is extended downwardly a sufficient amount to force the bottom of the insert article (e.g., the bottom lower beveled edge or bearing surface 82A of the nozzle base) against a shoulder portion 49 of the parison defining a part of the top opening of the container 50A. This shoulder portion 49 of the parison may be somewhat reduced in thickness compared to the other wall portions of the container 50A owing to a slight compression of the shoulder portion 49 by the composite blowing and filling mandrel during the prior step of blow molding and filling the container.

As can be seen with reference to FIG. 3, the sealing mold halves 308A and 310A have interior surfaces 320A that define a central cavity portion conforming to the exterior shape of the nozzle and cap insert article. When the sealing mold halves 308A and 310A are ultimately closed, the diameter of the sealing mold cavity, taken at any vertical position along the longitudinal vertical axis of the mold, is slightly larger than the corresponding exterior diameter of the insert article so as to accommodate the desired thickness of parison during the sealing step.

To effect the sealing step, the second or upper sealing mold halves 308A and 310A are moved from their open position (FIG. 3) to their closed or sealing position (FIG. 4) to compress at least some of the parison against at least a portion of the insert article to hermetically seal the top of the container 50A to the insert article. The pick up arm 600A can then be retracted upwardly to a position above the parison tube and above the gripper holding jaws 312A and 314A. If desired, the vacuum effected at the bottom of the pick up arm 600A can be terminated just before the arm 600A is raised. However, since the insert article is tightly engaged by the parison between the closed upper sealing mold halves 308A and 310A, continuous maintenance of the vacuum throughout the operation, including during and after retraction of the pick up arm 600A, will not prevent proper release of the insert article from the pick up arm 600A.

In accordance with the teachings of the present invention, the upper sealing mold halves 308A and 310A can be regarded generally as sealing mold means for sealing closed the container 50A. However, it is the interior molding surfaces 320A of the second or upper sealing mold halves 308A and 310A that can be said to function specifically as the molding means closable about the insert article and the surrounding parison 200 for compressing the parison between the insert article and the molding surfaces 320A to thereby seal the formed container 50A against at least a portion of the insert article.

The second or upper sealing mold means or mold halves 308A and 310A also include a forming means 350A for forming the frangible web 94A. The web forming means 350A preferably includes an inwardly projecting annular member or protrusion. The inwardly directed protrusion 350A functions as a frangible web forming means associated with the molding surfaces 320A for compressing further a portion of the parison against the exterior surface of the insert article to form a reduced thickness region defining the frangible web 94A. As described above in detail with reference to FIGS. 1 and 2, the frangible web 94A facilitates the destruction of at least a portion of the seal at the insert article so that access may be had to the insert article and so that the container contents 51 may be dispensed from the container 50A.

If desired, a knife edge 370A can be provided on the second or upper sealing mold halves 308A and 310A as best illustrated in FIGS. 3 and 4. When the sealing mold halves 308A and 310A are closed against the insert article, the knife edge 370A becomes positioned relatively close to the cylindrical exterior surface of the pick up arm 600A. This causes the knife edge 370A to penetrate through a substantial portion of the parison above the second or upper wall portion 61A (FIG. 4) of the closure structure 58A. As a result, the segment of the parison 200 extending upwardly above the upper wall portion 61A is almost, but not quite, severed from the top of the container 50A. Ultimately, this partially severed segment of the parison 200 is completely removed from the container 50A, as by breaking the segment off of the container by hand or with a suitable conventional automatic deflashing apparatus (not illustrated) known in the art.

After the pick up arm 600A has been raised to an elevated position above the holding jaws 312A and 314A, the molds are opened as best illustrated in FIG. 5. Specifically, the first or lower (main) mold halves 302 and 304 are opened. The second or upper sealing mold halves 308A and 310A, being carried on the main mold halves, necessarily also move away from the container 50A. In addition, the upper sealing mold halves 308A and 310A are independently moved relative to the main mold halves 302 and 304 to the extreme open position illustrated in FIG. 5.

In the preferred embodiment, the holding jaws 312A and 314A are moved together with, or mounted to, the first or main mold halves 302 and 304 (with conventional mounting means not shown in the schematic representation of FIGS. 3-5). Therefore, in this particular arrangement the holding jaws 312A and 314A are moved to the retracted (open) position when the main mold halves 302 and 304 are moved to the open position as illustrated in FIG. 5.

When the mold assembly 300 is fully open, the formed and filled container 50A is thus free and clear of the mold assembly and may be removed and deflashed by suitable conventional means. Typically, the container 50A can be supported on a movable pin (not illustrated) encapsulated in the flash at the bottom of the container in a manner well known in the art. The container 50A could then be removed from the mold area on the pin and transferred to a suitable conventional deflashing apparatus. During deflashing, the projecting flash (at the bottom of the container 50A, around the sides of the container, and the upwardly extending portion of the parison above the upper wall portion 61A) are broken away to provide a deflashed container substantially as illustrated in FIGS. 1 and 2.

In preparation for the next molding cycle, the pick up arm 600A and composite blowing and filling mandrel (not illustrated) are returned to their original positions wherein the mandrel is positioned over the mold assembly center line. In that position, the mandrel is ready to begin the next forming and filling cycle after the mold assembly has been moved to the extruder to receive a new length of parison and then returned to the molding, filling, inserting and sealing station with the parison located below the mandrel.

THE CONTAINER: SECOND EMBODIMENT

A second embodiment of a container of the present invention is illustrated in FIGS. 6 and 7 wherein the container is designated generally by reference numeral 50B. The container 50B has a generally cylindrical, hollow body portion 52B substantially similar to the body 52A of the first embodiment of the container 50A illustrated in FIGS. 1-2. Similarly, the second embodiment of the container 50B has a top closure structure 58B in which is mounted, and which retains, an auxiliary component that is a nozzle assembly having a nozzle with a base 73B and a cap 75B. The nozzle assembly is identical to the nozzle assembly of the first embodiment of the container 50A described above with reference to FIGS. 1-5.

The container 50B is substantially identical to the container 50A illustrated in FIGS. 1-2 except that the top of the closure structure 58B is completely sealed over the insert article and has a means by which the sealed portion may be broken to permit access to the article. In particular, at the top of the closure structure 58B there is provided a hollow shell or overcap structure 92B that is joined to the lower portion of the closure structure 58B by means of a frangible web or reduced thickness portion 94B of the molded thermoplastic material. The web 94B joins a lower or first wall portion 59B to an upper or second wall portion 61B and the exterior surface of the frangible web 94B is seen to define an annular notch. Also, two flat tabs 96B are provided on the sides of the overcap structure 92B.

When it is desired to gain access to the contents of the container 50B, force is applied to sever the frangible web 94B. For example, while holding the container body 52B, the overcap 92B can be grasped, with the thumb and forefinger pushing on opposite sides on the tabs 96B, so as to apply a rotational force or torque to the wall portion below the web 94B and an opposite torque to the wall portion above the web 94B. This will break the frangible web 94B whereby the overcap 92B can be removed from the container 50B. Access is thus provided to the top of the insert article. If the insert article comprises the above-described nozzle assembly, then the nozzle cap 75B can be unscrewed to permit the container contents 51B to be dispensed.

METHOD AND APPARATUS FOR MAKING THE SECOND EMBODIMENT OF THE CONTAINER

FIG. 7 schematically illustrates the manner in which the container 50B of FIG. 12 may be fabricated. In particular, the container 50B is initially formed and filled in the manner identical to that for forming and filling the first embodiment of the container 50A described above with reference to FIGS. 3-5. To this end, the lower or main mold halves 302 and 304 are provided along with the gripper holding jaws 312B and 314B. The main mold halves 302 and 304 are identical to the main mold halves described above with reference to the method for forming the first embodiment of the container 50A. Similarly, except for an increased elevation distance above the main mold halves 302 and 304, holding jaws 312B and 314B are identical to jaws 312A and 314A, respectively, described above with reference to the method for forming the first embodiment of the container 50A.

Second or upper sealing mold halves 308B and 310B are provided above the main mold halves 302 and 304 and below the jaws 312B and 314B. The upper sealing mold halves 308B and 310B are generally similar to the sealing mold halves 308A and 310A described above with reference to FIGS. 3-5. However, the upper sealing mold halves 308B and 310B do not have the knife edge structure 370A that was provided in the upper sealing mold halves 308A and 310A described above with reference to FIGS. 3-5. Rather, the upper portions of the sealing mold halves 308B and 310B define a generally cylindrical cavity 372B to accommodate the parison between the sealing mold halves (308B, 310B) and the exterior of the insert article.

The sealing mold halves 308B and 310B do define an inwardly projecting annular member or forming means 350B for forming the frangible web 94B in a manner analogous to the member 350A of the mold halves 308A and 310A described above (with reference to FIGS. 3-5). Specifically, the frangible web forming means 350B functions to compress further a portion of the parison against the exterior surface of the insert article to form a reduced thickness region defining the frangible web 94B. The configuration of the frangible web forming means 350B on the upper sealing mold halves 308B and 310B is designed to provide, for a given closure structure diameter and wall thickness, the desired frangible web thickness so that the frangible web 94B, while maintaining the necessary structural integrity during normal handling of the sealed container 50B, can be broken when sufficient force is applied to the formed overcap 92B.

In addition to the modified upper sealing mold halves 308B and 310B, the mold assembly for molding the modified container 50B includes a third mold means or pair of third mold halves 340B and 342B. The third mold halves 340B and 342B are movable relative to the main mold halves 302 and 304 and can be movable also with respect to the sealing mold halves 308B and 310B, if desired. Specifically, the third mold halves 340B and 342B are movable between the retracted position (not illustrated) and the closed or sealing and overcap-forming position illustrated in FIG. 7.

When the insert article is positioned between the sealing mold halves 308B and 310B (as with the transfer arm 600A described above with reference to FIGS. 3-5), the sealing mold halves 308B and 310B are closed to partially encapsulate the insert article. The third mold halves 340B and 342B can remain open during this step in the process or they can move together with mold halves 308B and 310B if the insert article positioning arm is retracted. The frangible web is formed by the forming means 350B of the sealing mold halves 308B and 310B coacting with the cylindrical exterior surface of the base of nozzle cap 75B.

Next, the first or main mold halves 302 and 304 are returned to the open position as well as the sealing mold halves 308B and 310B, the third or overcap-forming mold halves 340B and 342B, and the gripper jaws 312B and 314B. The formed container 50B, clear of the mold assembly, can thus be removed and moved to suitable apparatus for deflashing.

THE CONTAINER: THIRD EMBODIMENT

A third embodiment of the container of the present invention is illustrated in FIGS. 8 and 9 wherein the container is designated generally by the reference numeral 50C. As best illustrated in FIG. 8, the container 50C has a body portion or body 52C that when viewed from the top, is somewhat square with slightly convex sides and curved corners. The body 52C is hollow and otherwise similar to the body 52A of the first embodiment of the container 50A illustrated in FIGS. 1-2.

The container 50C has a top closure structure 58C in which is mounted, and which retains, an auxliary component or insert article—in this case comprising a nozzle assembly having a base 73C and a cap 75C. The nozzle assembly is identical to the nozzle assembly of the first embodiment of the container 50A described above with reference to FIGS. 1-5 and is also identical to the nozzle assembly of the second embodiment of the container 50B described above with reference to FIGS. 6 and 7.

The closure structure 58C that is completely sealed over the insert article nozzle assembly and has a means by which the sealed portion may be broken to permit access to the nozzle assembly as is explained in detail below. The closure structure 58C is very similar to the closure structure 58B of the second embodiment of the container 50B described above with reference to FIGS. 6 and 7. Consequently, the elements of the third embodiment that are identical or functionally analogous to those of the second embodiment are designated by reference numerals identical to those used in FIGS. 6 and 7 for the second embodiment with the exception that the third embodiment reference numerals are followed by the capital letter C whereas the second embodiment reference numerals are followed by the capital letter B.

The closure structure 58C is provided with a hollow shell or overcap structure 92C that is joined to the lower portion of the closure structure 58C by means of a frangible web or reduced thickness portion 94C of the molded thermoplastic material. The frangible web 94C is formed between a wall first or lower portion 59C and a wall second or upper portion 61C. The web and wall portions are identical to the corresponding elements of the second embodiment illustrated in FIGS. 6 and 7. However, the overcap structure 92C is different.

Specifically, the overcap structure 92C includes a first, hollow, cylindrical portion 92C' and a second, hollow, cylindrical portion 92C" having a relatively smaller outside diameter. The overcap structure 92C is further provided with outwardly extending and tapered flat tabs or wings 96C that are considerably larger than the tabs 96B of the second embodiment illustrated in FIG. 6 and that extend substantially along the entire height of the overcap cylindrical portions 92' and 92C", and down to wall upper portion 61C. This particular tab or wing configuration is well suited for use with relatively tough materials of construction such as polypropylene.

The method used to gain access to the contents of the container 50C is substantially identical to that employed to gain access to the contents of the second embodiment container 50B discussed above.

METHOD AND APPARATUS FOR MAKING THE THIRD EMBODIMENT OF THE CONTAINER

The method and apparatus for making the third embodiment of the container 50C are generally equivalent to the method and apparatus, respectively, for making the second embodiment of the container 50B discussed above with reference to FIGS. 6 and 7.

THE CONTAINER: FOURTH EMBODIMENT

A fourth embodiment of a container of the present invention is illustrated in FIGS. 10-12 wherein the container is designated generally by reference numeral 50D. The elements of the fourth embodiment that are identical or functionally analogous to those of the second and third embodiments are designated by reference numerals identical to those used for the second and third embodiments with the exception that the fourth embodiment reference numerals are followed by the capital letter D whereas the second and third embodiment reference numerals are followed by the capital letters B and C, respectively.

The container 50D has a hollow body portion or body 52D substantially similar to the body 52C of the third embodiment of the container 50C illustrated in FIGS. 8 and 9.

Similarly, the fourth embodiment of the container 50D has a top closure structure 58D in which is mounted, and which retains, an auxiliary component that includes insert assembly 71D (FIG. 11).

Assembly 71D includes a base 73D seated on an annular shoulder 57D of the top portion 56D of the container body 52D and includes a discharge conduit 72D defining the usual dispensing bore or aperture 74D extending from the upper distal end or nozzle of the conduit 72D, down through the conduit 72D, and to the bottom of the nozzle base 73D. The conduit 72D also includes an exterior annular flange or ridge 86D against which the parison is ultimately formed as will be described in more detail hereinafter.

The insert assembly base 73D includes a first frustoconical wall 73D' extending downwardly from the discharge conduit 72D, a second frustoconical wall 73D" extending downwardly from the first frustoconical wall 73D', and a seating shoulder 73D''' defined at the junction of the first and second frustoconical walls for seating the insert assembly 71D on the top portion 56D of the body 52D at the body opening. The insert assembly 71D also preferably includes a pierceable membrane 72D' extending across the bore 74D to occlude flow from the insert assembly 71D.

As best illustrated in FIGS. 10 and 11, the container 50D has a closure structure 58D that is completely sealed over the nozzle assembly 71D and includes means by which the sealed portion of the closure structure may be broken to permit access to the nozzle assembly 71D. In particular, the closure structure 58D can be more specifically defined as including a peripheral wall having a first or lower portion 59D and a second or upper portion 61D which are joined together with a frangible web or reduced thickness region 94D between the wall first portion 59D and the wall second portion 61D.

The frangible web 94D abuts the insert article, in particular, the sidewall of the nozzle assembly discharge conduit 72D. The wall second portion 61D extends outwardly from the discharge conduit 72D and defines an exterior thread 100D. The wall second portion 61D also merges with a hollow shell or overcap structure 92D which is spaced from the end of the discharge conduit 72D and serves to complete the encapsulation of the nozzle assembly 71D.

The container 50D further includes a separately formed cap 102D that has an internal thread 104D threadingly engaged with the closure structure wall second portion 61D. The cap 102D also preferably has a pair of tabs 103D (FIG. 10) to aid in turning the cap 102D. Such an arrangement is particularly useful when the container material is a relatively tough thermoplastic such as polypropylene.

The closure structure wall first portion 59D has, as best illustrated in FIG. 11, an annular shoulder 106D for supporting the cap 102D. To this end, the cap 102D has a skirt 108D defining a downwardly facing engaging surface 110D for bearing against the annular shoulder 106D when the cap 102D is screwed on the wall second portion 61D toward the wall first portion 59D.

Preferably, the closure structure wall exterior threads 100D and the mating internal threads 104D on the cap 102D are left-hand threads; however, both right-hand threads as well as left-hand threads can be used. When it is desired to gain access to the contents of the container 50D, the cap 102D with left-hand threads is simply manipulated to rotate in the conventional "cap opening" direction associated with a right-hand thread configuration. Such turning of the cap 102D then causes the cap 102D to screw down further onto the container 50D and bear against the annular shoulder 106D. As the cap 102D is thus rotated, part of the threading torque is transmitted as oppositely directed forces to the annular shoulder 110D on the closure structure wall first portion 59D and to the closure structure wall second portion 61D. This causes the oppositely directed forces to act across the frangible web 94D and to sever the wall portions from one another along web 94D. Access to the nozzle discharge conduit 72D is thus made possible.

After the upper or wall second portion 61D has been severed from the container and removed therefrom with the cap 102D, the remaining part of the now open container 50D appears as illustrated in FIG. 12. The level of torque required to sever the frangible web 94D depends, of course, on the size of the cooperating elements, the materials, the specific thread shape and configuration, etc. For a given design, the severance torque can be established at an approximate level that is great enough to prevent inadvertent severance during normal handling of the container.

When the cap 102D and closure structure second wall portion 61D have been removed from the container 50D, the pierceable membrane 72D' in the nozzle assembly 71D may be ruptured or pierced, as with a hypodermic syringe, cannula, spike, or the like, to permit the container contents to be withdrawn.

In the novel closure structure 58D described above for the fourth embodiment of the container 50D of the present invention, the insert article, such as the nozzle assembly 71D, need not be hermetically sealed on the top of the container body 52D. That is, there need not necessarily be a hermetic seal between the container body 52D and the seating shoulder 73D''' of the nozzle assembly base 73D (FIG. 11). It is merely sufficient that the nozzle assembly 71D be structurally supported at the opening of the container body 52D.

In the case where there is no hermetic seal between the container body 52D and the base 73D of the nozzle assembly 71D, some liquid contents from the container body 52D may find its way upwardly past the base 73D (or may evaporate past the nozzle assembly base 73D) into the annular space or chamber D between the nozzle assembly base 73D and the wall first portion 59D of the closure structure 58D. It is to be realized, however, that a hermetic seal is formed in all instances by the parison being pressed tightly against the peripheral flange 86D of the discharge conduit 72D below the frangible web 94D. Thus, the contents are always hermetically sealed within the container 50D.

In those situations where it is undesirable to permit any temporary accumulation of the container contents in the region past the nozzle assembly base 3D, one of two solutions can be provided. First, a true hermetical seal could be established between the parison forming the container body 52D and the base of the nozzle assembly 73D, especially at the nozzle assembly seating shoulder 73D'''. This can be accomplished by seating the nozzle assembly 71D with sufficient force and accuracy onto the container body 52D during fabrication.

However, if it is not desired to so critically control the fabrication steps to ensure a hermetic seal between the nozzle assembly base 73D and the container body 52D, a second approach to solving the problem may be used as illustrated in FIG. 11. Specifically, the nozzle assembly base 73D may be provided with one or more apertures or slots 114D which communicate between the chamber around the first frustoconical wall 73D' and the interior of the container body 52D and provide a drainage means. The aperture or apertures 114D function as very large or gross liquid return paths. These apertures 114D are readily observed by one using the container 50D. Thus, it is clear to one using the container 50D that the contents from the container body 52D may, and are intended to, flow past the base 73D of the nozzle assembly 71D and into the annular chamber D.

Further, when the container is positioned in the normal, upright position, the contents will readily flow from the chamber D back into the container body 52D.

In FIG. 11, the tops of the apertures 114D terminate somewhat below the pierceable membrane 72D'. If the apertures 114D are instead fabricated to extend upwardly, beyond the point illustrated in FIG. 11, all the way to the pierceable membrane 72D', then when the container 50D is inverted, substantially all of the contents of the container body 52D will be able to flow through the nozzle 72D after the membrane 72D' has been ruptured.

METHOD AND APPARATUS FOR MAKING THE FOURTH EMBODIMENT OF THE CONTAINER

The method and apparatus for making the fourth embodiment of the container of the present invention illustrated in FIGS. 10-12 are similar to the method and apparatus, respectively, disclosed for making the second embodiment of the container 50B discussed above with reference to FIGS. 6 and 7. However, owing to the specific configuration of the nozzle assembly insert article 71D, the method and apparatus can be somewhat simplified.

Specifically, with reference to FIG. 11, it is seen that the nozzle assembly base 73D has a diameter that is larger than the diameter of the portions of the nozzle assembly above the base wherein the parison is hermetically sealed against the nozzle assembly. The largest diameter of the nozzle assembly base 73D occurs at the seating shoulder 73D'''. Thus, with such a design, it is relatively easy to place the nozzle assembly 71D on the parison forming the opening of the container body 52D and to permit the thusly placed nozzle assembly 71D to then remain self-supporting while subsequent forming and sealing operations are effected on the parison around the nozzle assembly 71D (such as forming the frangible web 94D and the overcap structure 92D).

The fabrication method described generally above can be effected with the following specific steps. First, lower or main sealing mold halves are provided to operate in substantially the same manner as the main mold halves 302 and 304 described above with reference to the method for forming the second embodiment of the container 50B (FIG. 7). Similarly, there are provided a pair of holding jaws substantially identical to the holding jaws 312B and 314B described above with reference to the method of forming the second embodiment of the container 52B (FIG. 7).

Sealing mold halves are provided below the holding jaws and above the main mold halves. Such sealing mold halves are similar to the two sets of mold half pairs 308B, 310B and 340B, 342B described above with reference to the method for forming the second embodiment of the container 50B and illustrated in FIG. 7 except that only one pair of sealing mold halves is used. Specifically, the two left-hand mold halves 308B and 340B are combined into one integral mold half and the two right-hand mold halves 310B and 342B are combined into one, integral mold half. These combined sealing mold halves are then carried by, but are also movable independently of, the main or lower mold halves that define the cavity for the container body (i.e., identical to main mold halves 302 and 304 in FIG. 7). Such combined sealing mold halves define a cavity corresponding to the solidified parison forming the closure structure 58D illustrated in FIG. 11 and are adapted to compress portions of the parison against portions of the insert article or nozzle assembly 71D to form the final closure structure 58D illustrated in FIG. 11.

In addition, the sealing mold halves are provided with the necessary inwardly projecting annular member or forming means for forming the frangible web 94D. Such forming means are substantially the same as member 350B described above with reference to fabrication of the second embodiment of the container 50B illustrated in FIG. 7.

To fabricate the container 50D, the container body portion 52D is formed in the lower or main mold halves by suitable means in the manner discussed above for forming the container bodies 52A, 52B and 52C of the first, second and third container embodiments, respectively, as illustrated in FIGS. 1–9. If desired, the container body may then be filled with the desired amount of product in the manner already described in detail for the first embodiment of the container 50A with reference to FIGS. 1–5.

Next, a pick up and placement arm, similar to the above-described pick up and placement arm 600A (discussed above with respect to the method for forming the first embodiment of the container 50A with reference to FIGS. 1–5), is provided to engage a prefabricated nozzle assembly 71D and properly position it in the opening of the container body 52D. The pick up and placement arm is used to position the nozzle assembly 71D in registration with the container body opening and then lowers the nozzle assembly 71D until the annular seating shoulder 73D''' rests on the parison forming the top 56D of the container body portion 52D as illustrated in FIG. 11. At this point, the main mold halves are still closed about the container body 52D. The main mold halves extend upwardly to the horizontal line indicated on the right-hand side of FIG. 11, below which horizontal line is shown the designation "MAIN MOLD."

The pick up and placement arm then releases the nozzle assembly 71D onto the container top 56D at the container body opening and the arm is next sufficiently retracted to provide the necessary clearance to permit the sealing mold halves to effect the subsequent sealing operation.

At this point, the insert assembly 71D is entirely self-supported on the parison defining the container body top 56D at the opening of the container body 52D. In this respect, the method of positioning the insert assembly 71D is significantly different from the method used to position the insert articles for the first embodiment of the containers of the present invention previously described in that the insert assembly does not have to be held in place.

For example, in the first embodiment, the insert articles (such as the first embodiment nozzle and cap 75A illustrated in FIG. 4) are retained by the pick up and placement arm (600A in FIG. 4) while the sealing mold halves form a frangible web against the insert article per se and effect the hermetic seal of the parison to the insert article. Only after the frangible web and hermetic seal have been formed to properly hold the insert article in place is the pick up and placement arm disengaged from the insert article and then retracted.

In contrast, with the method for fabricating the fourth embodiment of the container 50D illustrated in FIG. 11, the pick up and placement arm releases the assembly 71D on the top of the container body 52D and is retracted prior to the sealing mold halves being moved inwardly to effect the formation of the closure structure 58D. During the subsequent step of placing the nozzle assembly 71D on the top of the container body 52D and during the subsequent step of retracting the pick up and placement arm, the tube of parison extending upwardly beyond the top of the main mold halves is, of course, held open by suitable holding jaws (such as holding jaws 312B and 314B illustrated in FIG. 7 for fabricating the above-described second embodiment of the container 50B).

After the nozzle assembly 71D has been properly placed on the top 56D of the container body 52D and after the pick up and placement arm has been retracted from the parison tube extending upwardly from the main mold halves, the sealing mold halves are extended inwardly above the main mold halves to form the closure structure 58D around the nozzle assembly 71D as illustrated in FIG. 11. During this step, the following structural elements are formed substantially simultaneously: (1) the frangible web 94D, (2) the hermetic seal of portions of the parison to the nozzle assembly (such as at the wall first portion 59D and the adjacent nozzle flange 86D), (3) the overcap 92, and (4) the external threads 100D.

Finally, the lower or main mold halves are returned to the open position and carry with them the sealing mold halves. The formed container 50D (without the cap 102D) is now clear of the mold assembly and can thus be moved to suitable apparatus for deflashing. Following deflashing, the cap 102D can be threaded onto the closure structure 58D to form the completed container 50D as illustrated in FIGS. 10 and 11.

THE CONTAINER: FIFTH EMBODIMENT

A fifth embodiment of the container, designated generally by reference numeral 50E, is illustrated in FIGS. 13 and 14. Elements of the fifth embodiment of the container 50E that are functionally analogous to elements of the fourth embodiment of the container 50D are designated by identical reference numerals with the exception that the reference numerals for the fifth embodiment are followed with the capital letter E, whereas the reference numerals for the fourth embodiment are followed by the capital letter D.

The container 50E has a body 52E generally similar to the body 52D of the fourth embodiment of the container 50D described above with reference to FIGS. 10–12. A composite insert article comprising a discharge conduit 71E a the opening of the container body portion 52E is provided. The discharge conduit 71E includes a lower or first, hollow, cylindrical portion 73E and a reduced diameter, hollow, cylindrical portion 72E above the lower portion 73E. The lower portion 73E has a seating shoulder 73E''' for engaging a first annular shoulder 57E on the top portion 56E of the container body 52E. The lower portion 73E also has an annular rib 86E to ensure proper sealing and gripping of the conduit 71E by the parison.

The top portion 72E of the discharge conduit 71E has exterior threads 130E. An inner or first cap 120E is secured to the portion 72E of the discharge conduit 71E. To this end, the cap 120E includes internal threads 132E for engaging the exterior threads 130E on the discharge conduit 71E.

The interior diameters of the lower portion 73E and of the upper portion 72E of the discharge conduit 71E are relatively large and provide a cross-sectional flow passage area that is a substantial percentage of the area of the opening of the container body 52E.

The container 50E is provided with a closure structure 58E that is functionally analogous to the closure structure 58D described above with reference to the fourth embodiment of the container 50D illustrated in FIGS. 10 and 11. Specifically, the closure structure 58E of the fifth embodiment of the container 50E illustrated in FIGS. 13 and 14 comprises solidified parison that has been molded in the particular illustrated configuration with portions of the parison formed to engage the side of the discharge conduit 71E. The top of the closure structure 58E is completely sealed over the discharge conduit 71E with an integral cover or overcap structure 92E that is spaced from the first cap 120E. Thus, the closure structure 58E has to be broken to permit access to the discharge conduit 71E and cap 120E.

To this end, the overcap structure 92E is joined to the lower portion of the closure structure 58E by means of a frangible web or reduced thickness portion 94E of the molded thermoplastic material. The web 94E joins a wall lower or first portion 59E to a wall upper or second portion 61E and the exterior surface of the frangible web 94E is seen to define an annular notch.

An exterior thread 100E is defined in the wall upper or second portion 61E of the closure structure 58E. A second cap 102E is provided with a downwardly depending skirt 108E. An internal thread 104E for engaging the exterior thread 100E on the closure structure 58E is defined by the skirt 108E.

In addition, the bottom edge of the second cap 102E defines an annular, downwardly facing, engaging surface 110E. The top 56E of the container body 52E is provided with an upwardly facing second annular shoulder 106E for engagement by the engaging surface 110E of the cap 102E. The cap 102E is also preferably provided with tabs 103E (FIG. 13) to aid in turning the cap.

Preferably, the thread on the cap 102E and the thread on the closure structure 58E are left-hand threads so that screwing the cap 102E in the conventional right-hand "unscrewing" direction will cause the cap to screw further downwardly onto the closure structure 58E. This will rupture the frangible web 94E of the closure structure 58E in a manner analogous to that described above for the fourth embodiment of the container 50D with reference to FIGS. 10–12.

When the frangible web 94E has been ruptured to sever the wall upper or second portion 61E from the wall lower or first portion 59E, the severed wall second portion 61E and the engaged second cap 102E are removed to provide access to the first cap 120E on the discharge conduit 71E.

The thread 130E on the discharge conduit 71E and the thread 132E on the first cap 120E are preferably right-hand threads to permit the cap 120E to be removed from the discharge conduit 71E with the conventional unscrewing rotation to provide access to the container contents.

METHOD AND APPARATUS FOR MAKING THE FIFTH EMBODIMENT OF THE CONTAINER

The method and apparatus for making the fifth embodiment of the container 50E are substantially the same as the method and apparatus, respectively, for making the fourth embodiment of the container 50D described above with reference to FIGS. 10–12. In FIG. 14, on the right hand side of the figure, there is illustrated a horizontal line below which is the designation "MAIN MOLD" indicating that the tops of the main mold halves lie at that horizontal line and that the main mold halves extend downwardly from that line to define the cavity for forming the container body 52E. The upper sealing mold halves extend upwardly from the horizontal line.

To fabricate the container 50E, the container body 52E is fabricated in a manner analogous to that for fabricating the container body 52D of the fourth embodiment of the container 50D as described above with reference to FIGS. 10 and 11. The body 52D may be filled if desired.

After the container body 52E is formed, a closure assembly, constituted by discharge conduit 71E threadingly engaged with the first cap 120E, is placed by a suitable pick up and placement arm on the container body top portion 56E so that the discharge conduit 71E is self-supporting on its seating shoulder 73E‴. The pick up and placement arm is then retracted to provide clearance for the inward closure of the upper sealing mold halves to form the closure structure 58E in the shape illustrated in FIG. 14. The upper sealing mold halves form (1) the frangible web 94E, (2) the hermetic seal regions of the closure structure wall first portion 59E to the discharge conduit 71E, (3) the exterior threads in the closure structure wall second portion 61E, and (4) the integral overcap cover structure 92E.

Next, the sealing mold halves and the main mold halves are retracted to release the container 50E for deflashing and to permit the second cap 102E to be threaded onto the container 50E.

FURTHER MODIFICATIONS TO THE CONTAINER EMBODIMENT

Each of the five embodiments of the container of the present invention described above has been illustrated as having a container body with one opening. It is to be realized that the container of the present invention may include more than one such opening or aperture, and that each of a plurality of such openings or apertures may be provided with an insert article and with partially or fully encapsulating closure structures of the types disclosed herein.

The embodiments of the novel container of the present invention, the methods for making the containers, and the apparatus for making the containers have been described above with reference to particular multi-piece insert articles which are retained by or within the closure structure at the top of the container body. Such insert articles need not necessarily be multi-piece assemblies, however. Rather, a single, unitary piece may be provided for retention within the closure structure. Such a unitary piece may or may not have a dispensing aperture therethrough, as desired.

If desired, such a single piece retained within the closure structure may be an impervious stopper plug insert or other such article. After severing the closure structure at the frangible web, the stopper or plug insert could be removed to permit access to the container contents per se. Alternatively, the stopper or plug insert could remain in the top of the container and a hypodermic syringe, cannula, spike or the like could be inserted through the stopper to effect extraction of the contents from the container.

Each novel closure structure of the containers of the present invention is provided with a frangible web formed against a portion of the insert article. Further, as with the first embodiment of the container, it is not required that the thermoplastic material forming the closure structure extend above the top of the insert article. Such an embodiment thus differs from containers fabricated by other methods wherein a frangible web is formed against the pick up arm above the insert article. Thus, such a container of the present invention can be fabricated with less material.

Further, when a portion of the insert article extends upwardly beyond the frangible web and beyond the top of the upper end of the closure structure (as with the first embodiment of the container illustrated in FIGS. 1 and 2), the exposed, projecting portion of the insert article can be easily grasped and manipulated to open the container by breaking the frangible web.

From the foregoing, it will be observed that numerous variations and modifications may be effected without departing from the true spirit and scope of the novel concept of the invention. It is to be understood that no limitation with respect to the specific articles, apparatus, and methods illustrated herein is intended or should be inferred. It is, of course, intended to cover by the appended claims all such modifications as fall within the scope of the claims.

What is claimed is:

1. In a method for forming a container from an extruded length of parison in the form of a vertically oriented, elongated, hollow tube positioned in a closed main mold while maintaining an opening at the top of a remaining length of parison above the closed main mold for accommodating an inserted blowing assembly by which the container body is blow molded, for thereafter removing said blowing asembly from said parison top opening, and for then sealing the top of the molded container;

the improvement in the method characterized in that, after said blowing assembly is removed from said parison top opening, the method further includes the following steps:
 (a) temporarily maintaining said top opening in said parison;
 (b) filling the molded container with a product;
 (c) positioning an insert article within said hollow tube of parison in said top opening at the top of said molded container body; and
 (d) engaging at least some of said remaining length of parison around the periphery of the top of the molded container body and compressing the engaged parison against the periphery of at least a portion of said insert article to hermetically seal the container to the insert article which remains in sealed engagement at the completion of the container formation while permitting subsequent removal of at least a portion of said insert article, said compressing step also including compressing said parison against the periphery of said insert article below the top of said insert article to form a reduced thickness region defining a peripheral frangible web spaced below the top of the insert article.

2. In a method for forming a container from an extruded length of parison in the form of a vertically oriented, elongated, hollow tube positioned in a closed main mold while maintaining an opening at the top of a remaining length of parison above the closed main mold as the container body is formed from the parison in the main mold and for thereafter sealing the top of the molded container;

the improvement in the method characterized in that, after said container body is formed, said step of sealing said container includes the following steps:
 (a) temporarily maintaining said top opening in said parison;
 (b) filling the molded container with contents;
 (c) positioning an insert article within said hollow tube of parison in said top opening at the top of said molded container body; and
 (d) engaging at least some of said remaining length of parison around the periphery of the top of the molded container body and compressing the engaged parison against the periphery of at least a portion of said insert article to form a peripheral wall member and seal the container to the insert article which remains in sealed engagement at the completion of the container formation while permitting subsequent removal of at least a portion of said insert article, said compressing step also including compressing a portion of said parison against the periphery of said insert article below the top of said insert article to form a reduced thickness region defining a peripheral frangible web joining first and second portions of the formed wall member spaced below the top of the insert article whereby force may be applied to said first and second portions to sever the frangible web and break at least a portion of said seal at said insert article.

* * * * *